United States Patent [19]

Johansson

[11] Patent Number: 4,629,970
[45] Date of Patent: Dec. 16, 1986

[54] SWITCHING CONVERTOR FOR GENERATING A CONSTANT MAGNITUDE DC OUTPUT VOLTAGE FROM A DC INPUT VOLTAGE HAVING A VARYING MAGNITUDE

[75] Inventor: Jan H. Johansson, Bålsta, Sweden

[73] Assignee: Telefonaktiebolaget L.M. Ericsson, Stockholm, Sweden

[21] Appl. No.: 696,307

[22] Filed: Jan. 30, 1985

[51] Int. Cl.$^4$ .............................................. G05F 5/00
[52] U.S. Cl. ..................................... 323/285; 323/288; 323/299
[58] Field of Search ......................... 323/285, 288, 299; 363/21

[56] References Cited

U.S. PATENT DOCUMENTS

| | | | |
|---|---|---|---|
| 4,459,539 | 7/1984 | Cordy | 323/299 |
| 4,536,700 | 8/1985 | Bello et al. | 323/285 |
| 4,546,421 | 10/1985 | Bello et al. | 323/288 |

FOREIGN PATENT DOCUMENTS

| | | | |
|---|---|---|---|
| 970338 | 10/1982 | U.S.S.R. | 323/285 |
| 1029161 | 7/1983 | U.S.S.R. | 323/299 |

OTHER PUBLICATIONS

Calvo et al., "Circuit to Linearize the Control Loop of a Switching Voltage Regulator", IBM Tech. Disc. Bul., vol. 22, No. 6, pp. 2191, 2192, Nov. 1979.

Frostholm, "One-Chip Controller Simplifies Switched-Mode Supplies", Electronics, vol. 52, No. 13, pp. 140–143, Jun. 21, 1979.

Primary Examiner—William H. Beha, Jr.
Attorney, Agent, or Firm—Knobbe, Martens, Olson & Bear

[57] ABSTRACT

An apparatus for generating a constant dc output voltage from a dc input voltage having a varying magnitude includes an inductor for storing an electrical charge and a semiconductor switch for controlling the application of the input voltage to the inductor. The apparatus further includes an error amplifier which compares the output voltage to a reference voltage and generates an error signal voltage proportional to the difference between the two voltages. An analog voltage divider generates a control voltage proportional to the ratio of the error signal voltage to the input voltage. The control voltage is applied to a pulse width converter which controls the duty cycle of the semiconductor switch responsive to changes in the input voltage such that the output voltage remains constant.

6 Claims, 9 Drawing Figures

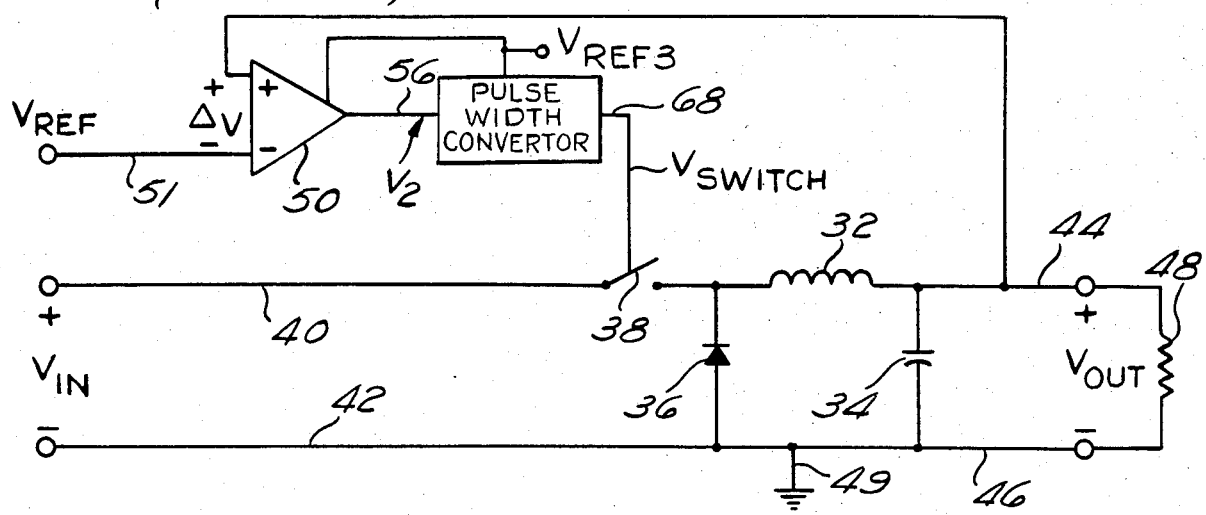
Fig. 4 (PRIOR ART)
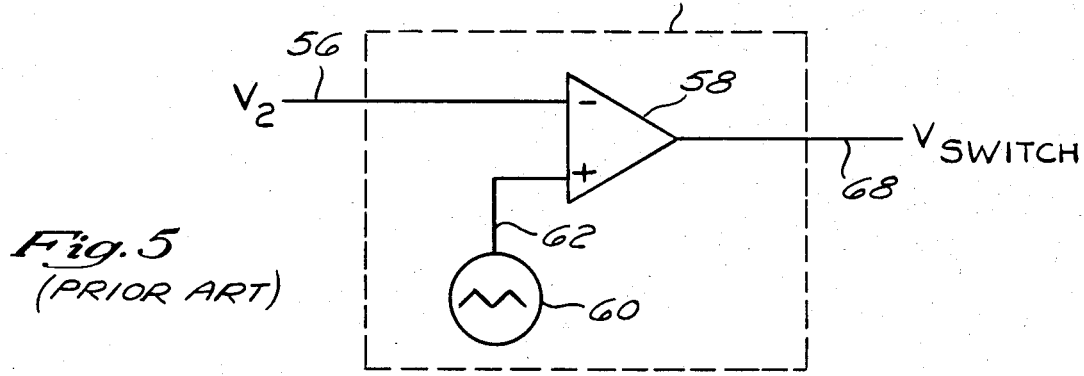
Fig. 5 (PRIOR ART)
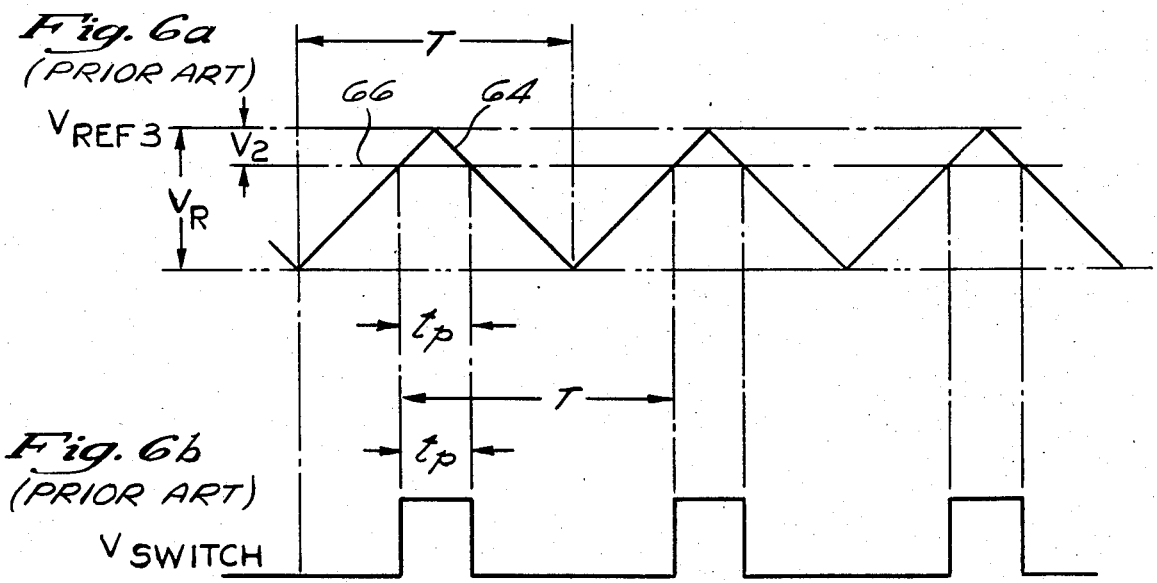
Fig. 6a (PRIOR ART)
Fig. 6b (PRIOR ART)

SWITCHING CONVERTOR FOR GENERATING A CONSTANT MAGNITUDE DC OUTPUT VOLTAGE FROM A DC INPUT VOLTAGE HAVING A VARYING MAGNITUDE

BACKGROUND OF THE INVENTION

This invention relates to switching voltage convertors, and, more particularly, to switching voltage convertors for providing a constant dc voltage from the voltage available on the subscriber loop of a telephone network.

In recent years there have been significant advances in the development of equipment to be used in conjunction with residential and business telephone services. Such advances include add-on devices such as low-cost speaker phones, automatic dialers, automatic answer machines, and the like. In addition, the International Telegraph and Telephone Consultative Committee (CCITT) has recently specified a four-wire "S" interface standard for digital customer access (DCA) in an Integrated Services Digital Network (ISDN) which allows direct digital communications as well as improved digitized voice communications within a customer's residential or business facility. Devices which have been designed to work with this improved interface have sophisticated analog and digital circuits which require well-regulated voltages.

Typically, the add-on devices are electrically connected to the subscribers' telephone lines to receive and transmit signals thereon. A number of voltage convertor devices have been developed for providing the power to the add-on devices from the telephone lines. These voltage convertor devices take advantage of the fact that a typical subscriber telephone line provides a voltage differential of approximately 40 volts across the telephone lines when the receiver is on hook. Therefore, this voltage can be used to provide a source of dc power during the on hook condition. Typically, the add-on devices have internal batteries which are charged during the on hook condition to provide a continuing source of dc power when the receiver is off hook.

A typical voltage requirement for an exemplary add-on telephone circuit is 5 volts dc. This 5 volt source of power must be derived from the nominal 40 volts between the subscriber lines. Generally, a further requirement is imposed that the power tapped from the subscriber telephone loop be maintained at or below 400 mW. In order to provide a maximum amount of power at the 5 volt level for the add-on circuits, it has been found to be particularly advantageous to use a switching voltage convertor to provide the voltage for the add-on circuits. Although switching voltage convertors are well known to the art, it has been found that the convertors generally available suffer from problems with regulation. That is, although the differential voltage on the telephone subscriber loop is nominally 40 volts, fluctuations in the loading of the subscriber networks can cause the voltage to vary such that it is as low as 20 volts and as high as 48 volts. Thus, the switching voltage convertors must be designed to provide a nominal output of 5 volts while the input voltage to the convertor varies by more than 20 volts. Thus, a switching voltage convertor for use with a telephone subscriber network must be capable of suppressing variations in the output voltage over a wide range of variations in the input voltage.

Various apparatus and methods have been developed in the art to suppress variations in the output voltage of switching voltage convertors. However, the apparatus are typically complex and require a large number of control components, many of which cannot be incorporated into a single integrated circuit. Thus, a need exists to provide a control circuit for a switching voltage convertor for providing a constant output voltage over a wide range of input voltages.

SUMMARY OF THE INVENTION

The present invention comprises a switching voltage convertor for use with a telephone subscriber loop. The converter transforms the nominal 40 volt differential voltage available between the lines of the telephone subscriber network to a constant low voltage, such as 5 volts dc. The low output voltage is maintained at a substantially constant level even though the input voltage may vary over a wide range.

The switching voltage convertor of the present invention comprises an inductor or a transformer which acts as a current equalizer. The input voltage from the subscriber telephone network is periodically connected to the inductor or transformer such that the electrical charge provided to the inductor while the line voltage is connected is substantially equal to the total charge supplied by the inductor to the load of the add-on circuit. The ratio of the output voltage to the input voltage is proportional to the ratio of the time during which the line voltage is connected to the inductance to the overall period of the switching means. In other words, the ratio of the output voltage to the input voltage is substantially equal to the duty cycle of the switching means.

The switching voltage convertor of the present invention further includes an error amplifier which compares the output voltage to a fixed reference voltage. The output of the error amplifier is provided as an input to an analog voltage divider which provides an output voltage proportional to the error voltage output of the error amplifier and inversely proportional to the input voltage from the telephone subscriber loop. The output of the analog divider is provided as an input to an error comparator which is also provided with a periodic linearly varying voltage, such as a triangle wave. The output of the error comparator is a square wave having a duty cycle substantially equal to the ratio of the desired output voltage to the input voltage. The output voltage thus generated is substantially constant and is independent of fluctuations in the input voltage.

An analog voltage divider for use in the present invention can be advantageously constructed as a bipolar integrated circuit and can be incorporated into the same integrated circuit comprising the error amplifier and the error comparator. Thus, the apparatus of the present invention is particularly advantageous in that the complete circuit for controlling a switching power convertor can be constructed with integrated circuit technology requiring a minimum number of external components and a minimum number of connections. The device can be manufactured as a compact unit having a minimal amount of power dissipation.

BRIEF DESCRIPTION OF THE DRAWINGS

FIG. 4 illustrates a typical switching voltage convertor using feedback to control the duty cycle of the means for switching the input voltage to the inductor.

FIG. 5 illustrates a typical pulse width convertor as used in FIG. 4.

FIG. 6a illustrates the relationship between the triangle wave and the error voltage in the pulse width convertor of FIG. 5; and FIG. 6b illustrates the resulting switch control voltage generated by the pulse width convertor in FIG. 5.

DETAILED DESCRIPTION OF THE PRESENT INVENTION

Figure 1:
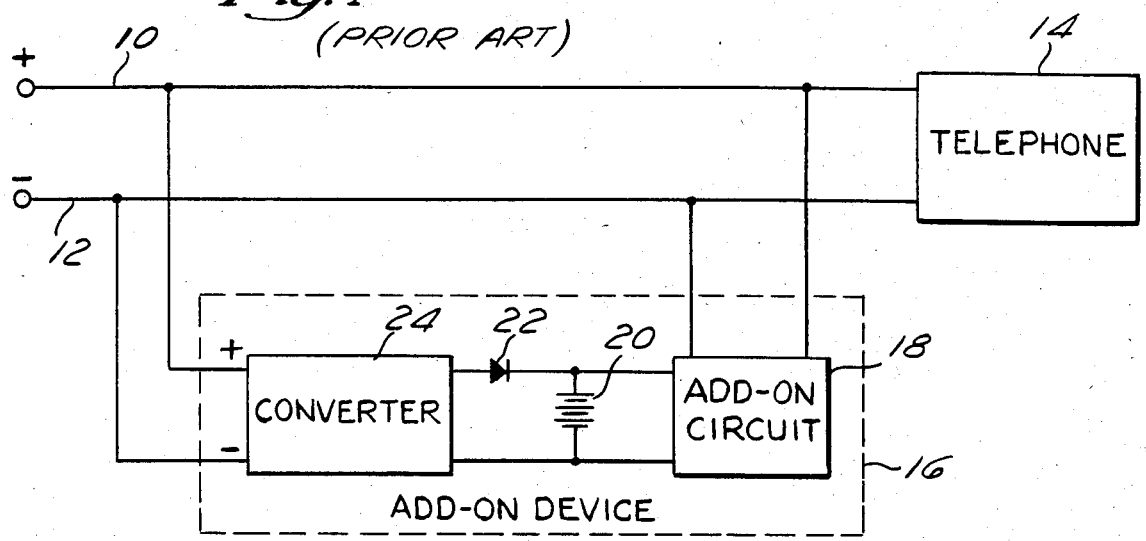
FIG. 1 illustrates the typical interconnections between a typical add-on device and a telephone subscriber loop.

FIG. 1 illustrates a typical subscriber telephone loop. A pair of wires 10, 12 connect a subscriber telephone 14 to a local serving switch (not shown). Typically, when the telephone 14 is in its cradle, i.e., on hook, the differential voltage between line 10 and the line 12 has a magnitude determined by the telephone source voltage and the voltage drops in the circuit between the local serving switch and the subscriber. Typically, the voltage source at the local serving switch is standardized at 48 volts dc. Because of line losses, the typical magnitude of the nominal differential voltage between the lines 10, 12 at the subscriber telephone 14 is approximately 40 volts and can be as low as 20 volts, depending upon the loading on the circuits served by a common power source. If the subscriber is relatively close to the serving switch, the differential voltage can approach the magnitude of the 48 volt source voltage. User activity on all the lines served by a common power source can cause the differential voltage between the lines 10, 12 to vary around the nominal voltage.

FIG. 1 also illustrates a typical add-on device 16 connected to the wires 10, 12 of the subscriber telephone loop. The add-on device 16 may comprise an add-on circuit 18, such as an automatic dialer, automatic answering device controller, or the like. The add-on circuit 18 may be powered by a battery 20 which provides a source of constant dc voltage. In the exemplary case of an automatic telephone dialer, the battery 20 will supply the dc voltage necessary to retain data in the memory circuits of the add-on circuit 18. Although the memory circuits may be low-power devices which require relatively little current to maintain the data within them, the battery 20 will gradually discharge until the voltage is too low to maintain the data in the memory devices. Furthermore, the add-on circuit 18 will draw additional current when in use which will discharge the battery 20. Thus, the exemplary add-on device 16 includes a voltage convertor 24 which provides a source of dc voltage through the diode 22 to maintain the battery 20 in its fully charged state.

Although the voltage convertor 24 could be an ac-to-dc convertor connected to the normal electrical service in a typical residence or business establishment, it has been found to be particularly advantageous to connect a dc-to-dc voltage convertor 24 to the differential voltage provided between the telephone lines 10, 12. Thus, the voltage convertor 24 must be capable of converting the nominal 40 volts dc voltage potential between the lines 10, 12 to the low voltage necessary to maintain the charge on the battery 20 and to operate the add-on circuit 18. Typically, the voltage required on the output of the voltage convertor 24 is approximately 5 volts. Thus, the voltage convertor 24 must be able to convert an input voltage which may vary from 20 volts to 48 volts to an output voltage of 5 volts.

Figure 2:
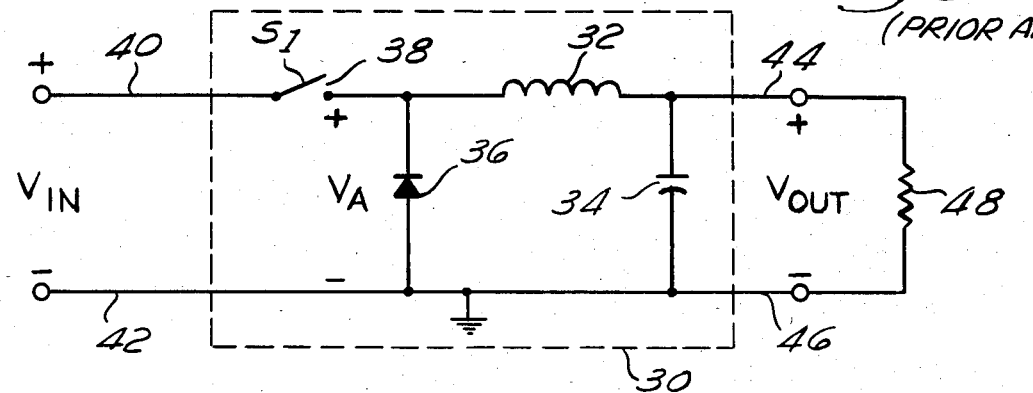
FIG. 2 illustrates the basic configuration of a switching voltage convertor of conventional type with an inductor or a transformer as a current equalizer.

FIG. 2 illustrates a schematic diagram of a basic voltage convertor circuit 30 which can be used in the voltage convertor 24 of FIG. 1. The voltage convertor circuit 30 comprises an inductor 32, a capacitor 34, a diode 36, and a switch 38. Although shown schematically as a mechanical switch, one skilled in the art will readily understand that the switch 38 is a semiconductor switch controlled by logic circuitry (not shown). The add-on device is represented as a resistive load 48 connected across the capacitor 34 via two terminals 44, 46.

A voltage $V_{IN}$ is applied to the voltage convertor circuit 30 on lines 40 and 42 which are connected to the telephone subscriber lines 10, 12, respectively in FIG. 1. When the switch 38 is closed, the voltage on the line 40 is applied to the inductor 32, causing a current to flow through the inductor to charge the capacitor 34 and to generate a voltage $V_{OUT}$ across the load 48. The charging current and the current through the load 48 return to the input power source via the line 42. When the switch 38 is opened, the current through the inductor 32 cannot change instantaneously and will continue to flow. The current in the inductor 32 will flow through the load 48 and through the diode 36, and back to the inductor 32, thereby completing a circuit. Thus, the stored energy in the inductor 32 provides the current necessary to maintain a relatively constant voltage $V_{OUT}$ across the capacitor 34 and the load 48 when the switch 38 is opened. The charge stored in the capacitor 34 will also provide current to the load 48.

In the example shown, the line 46 is connected to the line 42. The lines 42 and 46 are at a negative voltage polarity with respect to the input line 40 and the output line 44. This negative voltage serves as a reference for the other voltages in the circuit and will sometimes be shown and referred to as a signal ground reference 49. However, the lines 42 and 46 are not connected to the earth ground.

Figure 3:
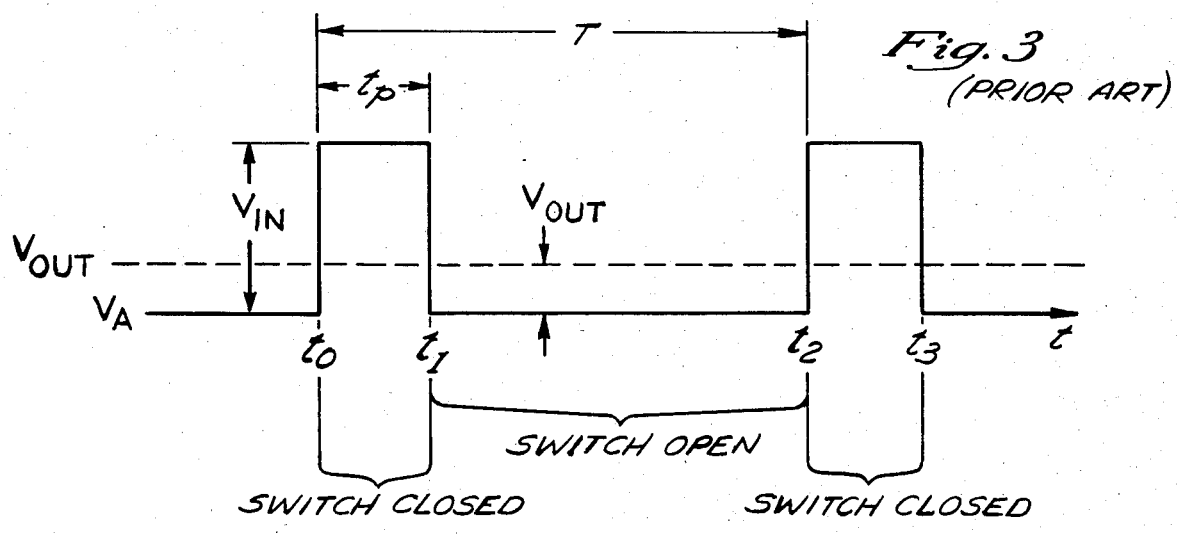
FIG. 3 illustrates the relationship between the input voltage, the output voltage, and the duty cycle of the switch in FIG. 2.

The magnitude of the voltage $V_{OUT}$ in FIG. 2, will depend upon the ratio of the amount of time during which the switch 38 is closed to the total time between sequential closings of the switch 38. This is illustrated more clearly in FIG. 3, which is a graph of voltage versus time. The solid line represents a voltage $V_A$ which is the voltage applied across the diode 36 (FIG. 2) when the switch 38 is closed. As illustrated, the voltage $V_A$ is substantially equal to 0 volts when the switch 38 is open. (The actual voltage will be equal to the voltage across the forward-biased diode 36 of approximately 0.2 to 0.7 volt in the polarity opposite to that shown.) At time $t_0$, the switch 38 is closed and the voltage $V_A$ across the diode 36 is substantially equal to the input voltage $V_{IN}$. The switch 38 is closed until time $t_1$ at which time it is opened and the voltage across the diode 36 again returns to zero. The switch 38 remains open until the time $t_2$ when it is again closed. In the example presented, the period of the switch operation, that is the time between subsequent closures of the switch 38 (i.e., the amount of time from $t_0$ to $t_2$), is represented by the time dimension T in FIG. 3. The amount of time during which the switch is closed (i.e., from $t_0$ to $t_1$) is represented by the time dimension $t_p$ in FIG. 3. Thus, the ratio of the time during which the switch 38 is closed to the total time between subsequent closures of the switch 38 is equal to $t_p/T$. This is also referred to as the duty cycle of the switch 38. The dashed line represents the output voltage $V_{OUT}$. As illustrated, and as will be explained below, the output voltage $V_{OUT}$ is proportional to the input voltage $V_{IN}$ in the same ratio as $t_p$ to T. Although shown as a constant voltage, it should be understood that the voltage $V_{OUT}$ will have a small ripple (i.e., variation in magnitude) caused by the charging of the capacitor 34 during the time $t_0$ to $t_1$ and the discharging of the capacitor 34 during the time $t_1$ to $t_2$. Typically, the frequency of the opening and closing of the switch 38 (i.e., 1/T) is approximately 100,000 KHz. The inductance of the inductor 32 is chosen such that at the minimum load on the output of the circuit, the inductor current will not decrease to zero. The capacitance of the capacitor 34 is chosen to keep the magnitude of the voltage ripple on the voltage $V_{OUT}$ within acceptable limits.

In order to keep the current through the inductor 32 of FIG. 2 substantially constant, the voltage-time area during the storing of energy in the inductor 32 while the switch 38 is closed should be the same as the voltage-time area during the removal of energy from the inductor 32 when the switch 38 is opened. Thus, the relationship between the output voltage $V_{OUT}$ and the input voltage $V_{IN}$ can be derived as follows:

$$\int_{t_0}^{t_1} (V_{IN} - V_{OUT})dt = \int_{t_1}^{t_2} V_{OUT} dt \qquad (1)$$

$$(V_{IN} - V_{OUT}) \cdot (t_1 - t_0) = V_{OUT}(t_2 - t_1) \qquad (2)$$

$$(V_{IN} - V_{OUT}) \cdot t_p = V_{OUT}(T - t_p) \qquad (3)$$

$$V_{IN} \cdot t_p = V_{OUT}(T - t_p + t_p) \qquad (4)$$

$$V_{IN} \cdot t_p = V_{OUT} T \qquad (5)$$

$$V_{OUT} = V_{IN} \cdot (t_p/T) \qquad (6)$$

As is evident from Equation (6), the ratio between the output voltage and the input voltage is the same as the duty cycle of the switch 38. Thus, for a constant input voltage, the output voltage can be controlled by varying the duty cycle of the switch 38. However, it the duty cycle of the switch 38 is maintained at a constant level, it is evident from Equation (6) that the output voltage will vary with variations in the input voltage. When $V_{IN}$ is the voltage differential between the lines 10, 12 of a typical subscriber telephone loop (FIG. 1), which can vary by as much as 20 volts, a constant duty cycle will be inoperable to provide a constant output voltage $V_{OUT}$.

FIG. 4 illustrates a typical improvement over the basic circuit illustrated in FIG. 2. The inductor 32, the capacitor 34, the diode 36, the switch 38, the voltage input lines 40, 42 and the voltage output lines 44, 46 correspond to like elements in FIG. 2. The circuit of FIG. 4 further includes an error amplifier 50 and an error voltage to pulse width convertor 52. The output of the pulse width convertor 52 controls the operation of the switch 38. The pulse width output of the pulse width convertor 52 determines the amount of time during which the switch 38 is closed.

The error amplifier 50 has a positive input connected to the line 44 and is therefore at the same voltage potential as $V_{OUT}$. The error amplifier 50 has a negative input connected to a line 51 to which is applied a temperature stabilized voltage $V_{REF}$. Thus, a voltage differential $\Delta V$, which is equal to $V_{OUT} - V_{REF}$, is present between the positive and negative inputs of the error amplifier 50. The error amplifier 50 has a voltage gain AV. The output of the error amplifier 50 generates a voltage on a line 56 which is referenced to a voltage reference $V_{REF3}$. $V_{REF3}$ is a positive voltage with respect to the signal ground reference 49. The output of the error amplifier 50 on the line 56 will be negative with respect to $V_{REF3}$. The magnitude of the voltage difference between the voltage on the line 56 and $V_{REF3}$ will be referred to herein as a voltage $V_2$. It should therefore be understood that the voltage $V_2$ shown in FIG. 4 is referenced to $V_{REF3}$ rather than the ground reference 49. The magnitude of $V_2$ varies according to the gain AV and the differential input voltage $\Delta V$ as follows:

$$V_2 = -\Delta V \cdot AV \qquad (7)$$

Thus, the magnitude of $V_2$ will increase when the output voltage $V_{OUT}$ decreases and will decrease when the voltage $V_{OUT}$ increases. Thus, the voltage on the line 56 will be more negative with respect to $V_{REF3}$ when the voltage $V_{OUT}$ decreases, and less negative with respect to $V_{REF3}$ when the voltage $V_{OUT}$ increases. The line 56 is connected to the input of the pulse width convertor 52.

The pulse width convertor 52 is shown in more detail in FIG. 5. In its simplest form, the pulse width convertor 52 comprises a comparator 58, having a positive input and a negative input, and a triangle wave generator 60. The voltage on the line 56 is provided as an input to the negative input of the comparator 58 and a time-varying reference voltage output of the triangle wave generator 60 on a line 62 is provided to the positive input to the comparator. The operation of the pulse width convertor can be understood by referring to FIGS. 6a and 6b.

FIG. 6a illustrates a triangle wave reference voltage 64 having a maximum amplitude $V_R$ with respect to $V_{REF3}$, and having a period of repetition of duration T. The triangle wave 64 is generated by the triangle wave generator 60 (FIG. 5). Also shown in FIG. 6a is a voltage 66 which corresponds to the voltage on the line 56. The voltage 66 is lower (i.e., less positive) than the voltage $V_{REF3}$ by the magnitude $V_2$. As can be seen, the voltage of the triangle wave 64 is more positive than the voltage 66 for an amount of time $t_p$ during each period T. Since the voltage 66 and the voltage of the triangle wave 64 are both referenced to $V_{REF3}$, the magnitude of the differential voltage $V_2$ is greater than the magnitude of the voltage difference between the triangle wave 64 and $V_{REF3}$ during the time interval $t_p$. Using geometry, it should be understood that:

$$tp/T = V_2/V_r \qquad (8)$$

The output of the comparator 58 will be high only during that time when the voltage of the triangle wave 64 exceeds the voltage 66, or, in other words, when the magnitude of the differential voltage $V_2$ exceeds the magnitude of the triangle wave 64 with respect to $V_{REF3}$. Thus, an output voltage $V_{SWITCH}$ on a line 68, connected to the output of the comparator 58, will be high for a duration $t_p$ and will have a repetition rate of 1/T. In other words, the duty cycle of the switch 38 (i.e., the ratio of the time during which the switch 38 is closed to the time between sequential closures of the switch 38) is $t_p/T$. In the preferred embodiment, the switch 38 is connected to the line 68 and will close when the voltage $V_{SWITCH}$ on the line 68 is high and will open when the voltage $V_{SWITCH}$ is low. One skilled in the art will understand that other linearly varying voltages, such as a sawtooth, can also be used as the reference voltage 66 on the line 62 in FIG. 5.

If Equation (8) is combined with Equation (6), then:

$$V_{OUT} = V_{IN} \cdot (V_2/V_R) \qquad (9)$$

Combining Equation (7) with Equation (9), it must follow that:

$$V_{OUT} = (V_{IN}/V_R) \cdot (-\Delta V \cdot AV) \qquad (10)$$

The loop gain, $AV_{LOOP}$, as used herein, is defined as the ratio of the output voltage $V_{OUT}$ to the differential input voltage $\Delta V$ to the error amplifier 50. Thus:

$$AV_{LOOP} = \frac{V_{OUT}}{\Delta V} = \frac{\frac{V_{IN}}{V_R} \cdot (-\Delta V \cdot AV)}{\Delta V} = \frac{-AV \cdot V_{IN}}{V_R} \qquad (11)$$

Since $\Delta V$ is equal to $V_{OUT} - V_{REF}$, it must follow from Equation (10) that:

$$V_{OUT} = (V_{IN}/V_R) \cdot AV \cdot (V_{REF} - V_{OUT}) \qquad (12)$$

An important measure of the relative quality of a switching voltage convertor is the capability of suppressing input voltage variations. For the voltage convertor illustrated in FIG. 4, the capability of suppressing input voltage variations can be evaluated by deriving $dV_{OUT}$ with respect to $dV_{IN}$ from Equation (12) as follows:

$$dV_{OUT} = dV_{IN} \cdot \frac{AV}{V_R} \cdot (V_{REF} - V_{OUT}) - dV_{OUT} \cdot \frac{AV \cdot V_{IN}}{V_R} \qquad (13)$$

$$dV_{OUT}\left[1 + \frac{AV \cdot V_{IN}}{V_R}\right] = dV_{IN} \cdot \frac{AV}{V_R} \cdot (V_{REF} - V_{OUT}) \qquad (14)$$

Substituting Equation (12) into the right-hand portion of Equation (14), it follows that:

$$dV_{OUT}\left[1 + \frac{AV \cdot V_{IN}}{V_R}\right] = dV_{IN} \cdot \frac{V_{OUT}}{V_{IN}} \qquad (15)$$

Thus:

$$\frac{dV_{OUT}}{V_{OUT}} = \frac{dV_{IN}}{V_{IN}} \cdot \frac{1}{1 + \frac{AV \cdot V_{IN}}{V_R}} = \frac{dV_{IN}}{V_{IN}} \cdot \frac{1}{1 - AV_{LOOP}} \qquad (16)$$

From Equation (16), it is apparent that the suppression of the effect of input voltage variations on the output voltage is dependent on the loop gain $AV_{LOOP}$ and thus dependent upon the magnitude of the input voltage $V_{IN}$. Furthermore, since the loop gain $AV_{LOOP}$, from Equation (11), depends upon the input voltage, the stabilization of the feedback loop is more difficult. A known method for solving this problem is to make the amplitude of the ramp voltage $V_R$ proportional to $V_{IN}$ as follows:

$$V_R = k_R \cdot V_{IN} \qquad (17)$$

where $k_R$ is a proportionality constant. Thus, Equation (9) becomes:

$$V_{OUT} = V_{IN} \cdot \frac{V_2}{k_R \cdot V_{IN}} = V_2/k_R \qquad (18)$$

and Equation (12) becomes:

$$V_{OUT} = (V_{REF} - V_{OUT}) \frac{AV}{k_R} = \frac{-\Delta V \cdot AV}{k_R} \qquad (19)$$

and the loop gain from Equation (11) becomes:

$$AV_{LOOP} = \frac{V_{OUT}}{\Delta V} = \frac{-AV}{k_R} \qquad (20)$$

Thus, neither the output voltage $V_{OUT}$ nor the loop gain $AV_{LOOP}$ is dependent upon the input voltage $V_{IN}$. However, in order to accomplish the foregoing improvement, it is necessary to provide a maximum voltage for the ramp of the triangle generator proportional to $V_{IN}$. This may be accomplished by clocking the triangle wave generator with a fixed frequency and providing a charging current to an internal capacitor proportional to $V_{IN}$. This known method has the particular disadvantage of using a relatively large number of external components to produce the variable charging current, thus requiring additional interconnections to an integrated circuit.

Figure 7:
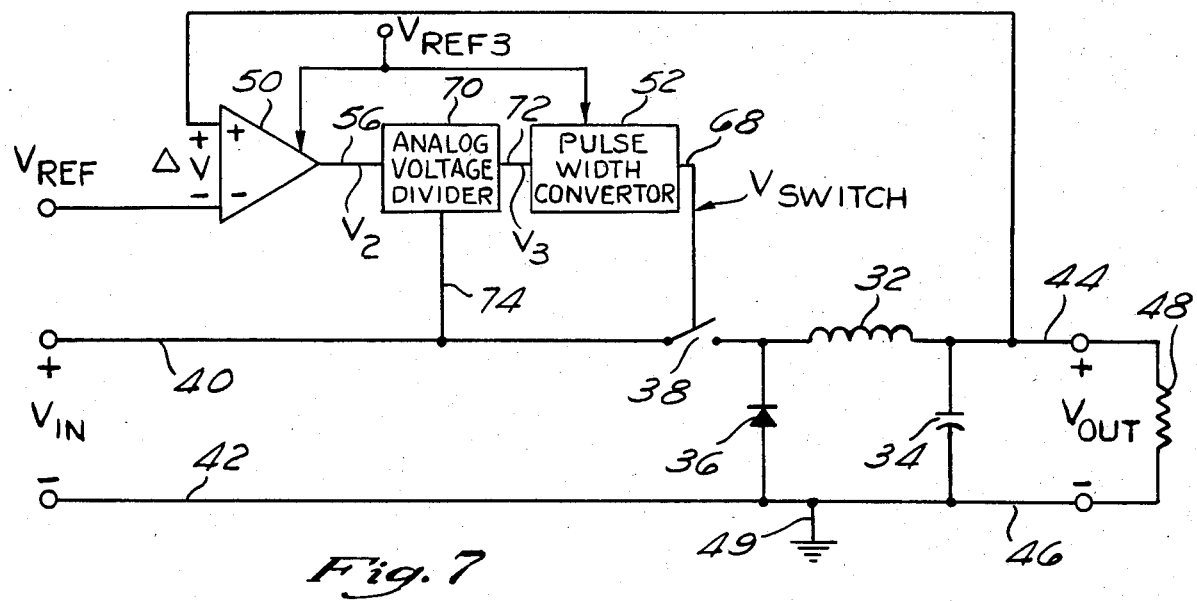
FIG. 7 illustrates a switching power convertor of the present invention incorporating an analog voltage divider to eliminate the dependence of the output voltage on fluctuations in the input voltage.

The present invention avoids the problems of the above-described devices by including an analog voltage divider 70 between the error amplifier 50 and the pulse width convertor 52, as illustrated schematically in FIG. 7. In FIG. 7, elements corresponding to the elements of FIG. 4 have like numbers. In FIG. 7, the line 56 connected to the output of the error amplifier 50, is not connected directly to the pulse width convertor 52. Instead, the analog voltage divider 70 has one input connected to the line 56 and a second input connected to a line 74 which is connected to the input voltage $V_{IN}$. The analog voltage divider 70 has an output voltage on a line 72 which is connected to the input of the pulse width convertor 52. The voltage on the line 72 is referenced to $V_{REF3}$, and is less positive than $V_{REF3}$. The magnitude of the difference between the voltage on the line 72 and $V_{REF3}$ will be referred to as $V_3$. The analog voltage divider 70 is constructed such that the voltage $V_3$ is proportional to the ratio of the voltage $V_2$ to the input voltage $V_{IN}$ as follows:

$$V_3 = (V_2/V_{IN}) \cdot k_3 \qquad (21)$$

Thus, substituting $V_3$ for $V_2$ in Equation (9), it follows that:

$$V_{OUT} = \frac{V_{IN} \cdot \frac{V_2 \cdot k_3}{V_{IN}}}{V_R} = \frac{V_2 \cdot k_3}{V_R} \qquad (22)$$

Since from Equation (7), $V_2 = -\Delta V \cdot AV$, the loop gain $AV_{LOOP}$ can be determined as follows:

$$AV_{LOOP} = \frac{V_{OUT}}{\Delta V} = \frac{\frac{V_2 \cdot k_3}{V_R}}{-V_2/AV} = \frac{-AV \cdot k_3}{V_R} \qquad (23)$$

Thus, the loop gain $AV_{LOOP}$ is constant and is independent of the input voltage. Furthermore, Equation (22) can be expanded as follows:

$$V_{OUT} = \frac{(-\Delta V \cdot AV) \cdot k_3}{V_R} = \frac{AV \cdot (V_{REF} - V_{OUT}) \cdot k_3}{V_R} \qquad (24)$$

$$V_{OUT} = \frac{AV \cdot V_{REF} \cdot k_3/V_R}{1 + AV \cdot k_3/V_R} \qquad (25)$$

Thus, the output voltage $V_{OUT}$ is a constant voltage independent of the magnitude of the input voltage and is dependent only upon circuit parameters which can be maintained substantially constant. Therefore, a switching voltage convertor built according to this invention provides a constant output voltage irrespective of fluctuation in the input voltage.

Figure 8:
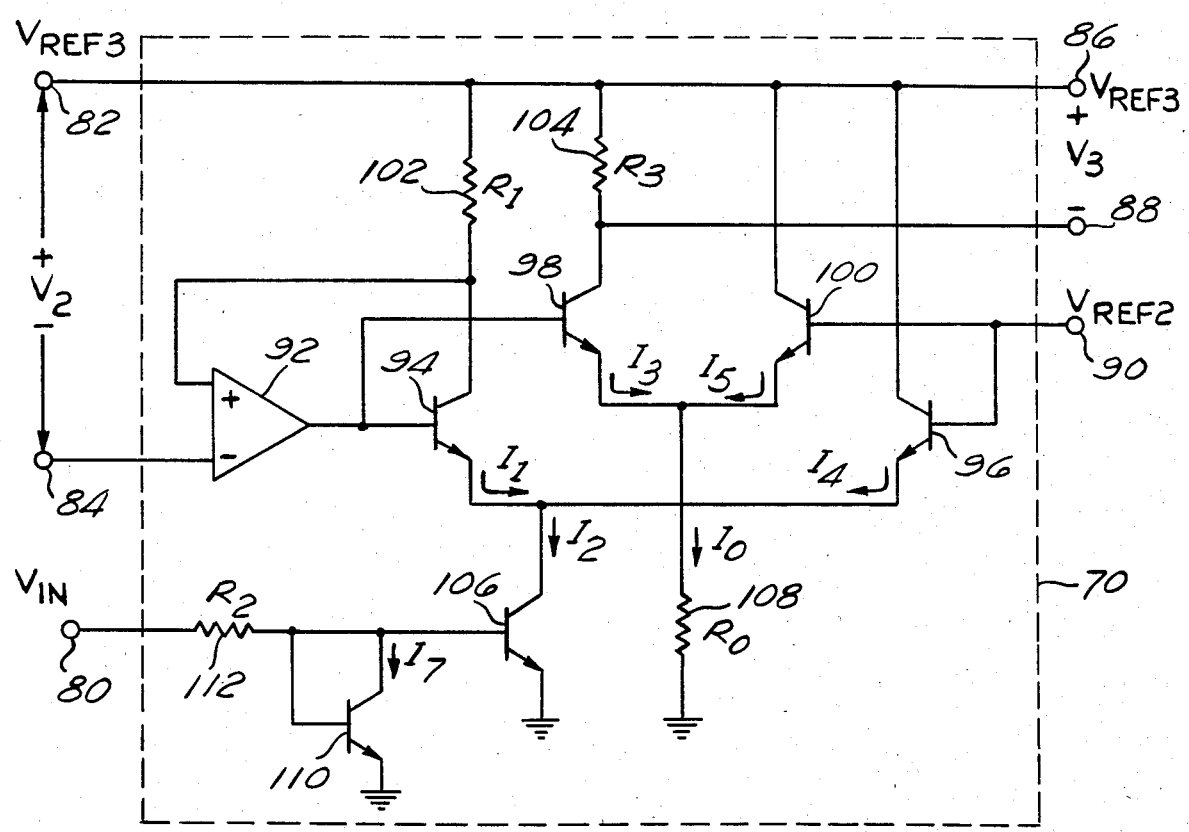
FIG. 8 illustrates a preferred embodiment of an anaog voltage divider as used in FIG. 7.

FIG. 8 illustrates a preferred embodiment of the analog voltage divider 70 shown in FIG. 7. In the preferred embodiment, the analog voltage divider 70 is incorporated into an integrated circuit device which also includes the error amplifier 50 and the pulse width convertor 52. Thus, although shown and described with respect to a number of input and output terminals, the terminals are for reference only and are not intended to designate external connections to the integrated circuit.

The analog voltage divider 70 has an input terminal 80 for applying the input voltage $V_{IN}$. An input terminal 82 is connected to the reference voltage $V_{REF3}$, described in connection with FIG. 7. An input terminal 84 is connected to the line 56 (FIG. 7) and is thus connected to the output of the error amplifier 50. Therefore, the voltage on the terminal 84 is lower (less positive) than the voltage $V_{REF3}$ on the terminal 82 by the magnitude $V_2$ as indicated on FIG. 8. The analog voltage divider 70 generates an output voltage on an output terminal 88. The voltage on the terminal 88 is also referenced to $V_{REF3}$, shown on a terminal 86. The voltage on the terminal 88 will be lower (i.e., less positive) than the voltage $V_{REF3}$ on the terminal 86. The magnitude of the voltage difference between the voltage on the terminal 88 and $V_{REF3}$ will be referred to as $V_3$, and, as will be set forth below, will be related to $V_{IN}$ and $V_2$ according to Equation (21) above. The voltage on the terminal 88 is provided as the input to the convertor 52 on the line 72 as illustrated in FIG. 7. Thus, the convertor 52 is responsive to the magnitude of the voltage $V_3$.

A terminal 90 is connected to a voltage $V_{REF2}$ which is also generated within the integrated circuit. In the exemplary embodiment described, $V_{REF2}$ has a magnitude that is larger than $V_{REF}$ in FIG. 7 by an amount equivalent to the voltage drop across a forward-biased base-emitter junction. $V_{REF}$ is a temperature-stabilized voltage generated in a conventional manner known to the art.

The analog voltage divider 70 further includes a differential amplifier 92 having a positive input, a negative input, and an output. The positive input of the differential amplifier 92 is connected to a resistor 102 and the collector of a transistor 94. The other side of the resistor 102 is connected to the terminals 82 and 86 and thus has $V_{REF3}$ applied to it. The negative input of the differential amplifier 92 is connected to the terminal 84 and thus is at a voltage level that is the magnitude of $V_2$ lower than $V_{REF3}$. The output of the differential amplifier 92 is connected to the base of the transistor 94 and to the base of a transistor 98.

The emitter of the transistor 94 is connected to the emitter of a transistor 96 and to the collector of a transistor 106. The base of the transistor 96 is connected to the terminal 90, and thus to $V_{REF2}$. The base of the transistor 96 and the terminal 90 are also connected to the base of a transistor 100. The collector of the transistor 96 and the collector of the transistor 100 are connected to the terminals 82 and 86 and thus have the voltage $V_{REF3}$ applied to them. The emitter of the transistor 100 is connected to the emitter of the transistor 98 and to a resistor 108. The other side of the resistor 108 is connected to the ground reference. The collector of the transistor 98 is connected to a resistor 104 and to the output terminal 88. The other side of the resistor 104 is connected to the terminals 82 and 86 and thus has the voltage $V_{REF3}$ applied to it.

The emitter of the transistor 106 is connected to the ground reference. The base of the transistor 106 is connected to the collector and the base of a transistor 110. The emitter of the transistor 110 is connected to the ground reference. The base of the transistor 106 and the base and the collector of the transistor 110 are connected to a resistor 112. The other side of the resistor 112 is connected to the terminal 80, and thus to $V_{IN}$.

The magnitude of the resistance of the resistor 112 is designated as $R_2$. The voltage $V_{IN}$ applied to the terminal 80 is sufficient to bias the transistors 110 and 106 in their active regions. Since the bases and the emitters of the transistors 110 and 106 are connected in parallel, the base-emitter voltages $V_{BE}$ of the two transistors are the same. Since the two transistors are constructed identically on the same integrated circuit, the collector current of the transistor 106 (shown as $I_2$) will be the same as the collector current of the transistor 110 (shown as $I_7$) and will be equal to $(V_{IN} - V_{BE})/R_2$. Thus, the collector current through the transistor 106 is proportional to the input voltage $V_{IN}$, and, since the base-emitter voltage $V_{BE}$ is very small compared to $V_{IN}$, is substantially equal to $V_{IN}/R_2$.

The transistor 100 is forward biased by the voltage $V_{REF2}$ applied to the base of the transistor 100 via the terminal 90. Therefore, the voltage on the emitter of the transistor 100 is substantially equal to $V_{REF2}$ minus the magnitude of the voltage across a forward-biased base-emitter junction. Since the voltage $V_{REF2}$ has been fixed at the magnitude of $V_{REF}$ plus the magnitude of the voltage across a forward-biased base-emitter junction the voltage on the emitter of the transistor 100 will be substantially equal to $V_{REF}$. In the preferred embodiment, the forward-biased diode which determines the magnitude of $V_{REF2}$ will be constructed in the same integrated circuit as the transistor 100. Therefore, any temperature caused variations in the voltage drop of the forward-biased base-emitter junction which determines the magnitude of $V_{REF2}$ will be matched with a change in the base-emitter voltage drop of the transistor 100. Therefore, the voltage on the emitter of the transistor 100 will remain substantially constant at a magnitude substantially equal to $V_{REF}$. The voltage $V_{REF}$ thus generated is applied to the resistor 108. The resistor 108 has a resistance magnitude of $R_0$. Therefore, the current through the resistor 108 has a magnitude equal to $V_{REF}/R_0$. This current is designated as $I_0$ in FIG. 8.

Circuit theory applied to that portion of the circuit involving the differential amplifier 92, the transistor 94 and the resistor 102 shows that the connection between the resistor 102 and the positive input of the differential amplifier 92 causes the voltage across the resistor 102 to be substantially equal to the voltage $V_2$ applied between the terminal 82 and the terminal 84. If the current through the resistor 102 increases, the voltage on the positive terminal of the differential amplifier 92 decreases and the voltage on the output of the differential amplifier 92 decreases, thus, decreasing the voltage applied to the base of the transistor 94. Thus, the collector current of the transistor 94 decreases, thereby returning the voltage across the resistor 102 to a magnitude substantially equal to the voltage $V_2$. Thus, designating the magnitude of the resistance of the resistor 102 as $R_1$, the magnitude of the collector current of the transistor 94 is equal to $V_2/R_1$. Neglecting the small amount of base current in the transistor 94, the collector current is substantially equal to the emitter current through the transistor 94 and is shown in FIG. 8 as a current $I_1$ flowing from the emitter of the transistor 94.

The transistors 94, 96, 98, 100, 106 and 110 are bipolar integrated transistors constructed on the same substrate. The transistor 94 and the transistor 96 are constructed to have identical emitter areas. Similarly, the transistor 98 and the transistor 100 are constructed to have identical emitter areas. As is well known in the art, the saturation current $I_S$ of transistors is a constant for all transistors having the same emitter area in one integrated circuit. As is also well-known, the collector current in a transistor can be given by the following equation:

$$I_C = I_S \cdot e^{(V_{BE}q/nkT)} \tag{26}$$

where $I_C$ is a collector current; $I_S$ is the saturation current; $V_{BE}$ is the base-emitter voltage; q is the electron charge, $1.6 \times 10^{-19}$ coulomb; n is an empirical constant; k is Boltzmann's constant, $1.38 \times 10^{-23}$ joules/°K.; and T is the absolute temperature. Since the transistors 94 and 96 are constructed with the same emitter area, the saturation currents for the two transistors are the same. Therefore, the ratio between the collector current of the transistor 94, designated as $I_1$, and the collector current of the transistor 96, designated as $I_4$, is as follows:

$$\frac{I_1}{I_4} = \frac{I_S \cdot e^{(V_{BE94}q/nkT)}}{I_S \cdot e^{(V_{BE96}q/nkT)}} = e^{(V_{BE94} - V_{BE96}) \cdot q/nkT} \tag{27}$$

where $V_{BE94}$ is the base-emitter voltage of the transistor 94, and $V_{BE96}$ is the base-emitter voltage of the transistor 96. Therefore, taking the natural logarithm of both sides of Equation (27):

$$\ln(I_1/I_4) = (V_{BE94} - V_{BE96}) \cdot q/nkT = \Delta V_{BE(94-96)} \cdot q/nkT \tag{28}$$

where $\Delta V_{BE(94-96)}$ is the differential voltage between the base of the transistor 94 and the base of the transistor 96.

Similarly, since the transistor 98 and the transistor 100 are constructed with the same emitter areas, the collector current through the transistor 98 designated as $I_3$, and the collector current through the transistor 100, designated as $I_5$, are related as follows:

$$\ln(I_3/I_5) = \Delta V_{BE(98-100)} \cdot q/nkT \tag{29}$$

where $\Delta V_{BE(98-100)}$ is the differential voltage between the base of the transistor 98 and the base of the transistor 100.

Since the base of the transistor 98 is connected to the base of the transistor 94, and since the base of the transistor 100 is connected to the base of the transistor 96, the differential voltage between the bases of the two pairs of transistors should be the same as follows:

$$\Delta V_{BE(98-100)} = \Delta V_{BE(94-96)} \tag{30}$$

Thus, from Equations (28) and (29):

$$\frac{nkT}{q} \cdot \ln(I_1/I_4) = \frac{nkT}{q} \cdot \ln(I_3/I_5) \tag{31}$$

Therefore, it must follow that:

$$I_3/I_5 = I_1/I_4 \tag{32}$$

From FIG. 8, it is apparent that $I_0$ is the sum of the emitter current $I_3$ of the transistor 98 and the emitter current $I_5$ of the transistor 100 as follows:

$$I_3 + I_5 = I_0 \tag{33}$$

and $I_2$ is the sum of the emitter current $I_1$, of the transistor 94 and the emitter current $I_4$ of the transistor 96 as follows:

$$I_1 + I_4 = I_2 \tag{34}$$

If the expressions for $I_5$ and $I_4$ from Equations 33 and 34, respectively, are inserted into Equation 32, it must then follow that:

$$\frac{I_3}{I_0 - I_3} = \frac{I_1}{I_2 - I_1} \tag{35}$$

Using algebra, $I_3$ can be found in terms of $I_0$, $I_1$ and $I_2$ as follows:

$$I_3 = \frac{I_1 \cdot I_0}{I_2} \tag{36}$$

$I_3$ is substantially equal to the collector current through the transistor 98, and therefore equal to the current through the resistor 104. The magnitude of the resistance of the resistor 104 is designated as having a value $R_3$. Therefore since the voltage $V_3$ is taken across the resistor 104, it must therefore follow that:

$$I_3 = V_3/R_3 \tag{37}$$

As established above, the following relationships hold for the currents $I_0$, $I_1$, and $I_2$.

$$I_0 = V_{REF}/R_0 \tag{38}$$

$$I_1 = V_2/R_1 \tag{39}$$

$$I_2 = V_{IN}/R_2 \tag{40}$$

Substituting Equations 37, 38, 39 and 40 into Equation 36, the following relationship is found:

$$V_3/R_3 = \frac{\left(\frac{V_2}{R_1} \cdot \frac{V_{REF}}{R_0}\right)}{\frac{V_{IN}}{R_2}} = \frac{V_2}{R_1} \cdot \frac{V_{REF}}{R_0} \cdot \frac{R_2}{V_{IN}} \tag{41}$$

Therefore:

$$V_3 = \frac{V_2}{V_{IN}} \cdot \frac{R_3}{R_1} \cdot \frac{R_2}{R_0} \cdot V_{REF} \tag{42}$$

By comparing Equation 42 with Equation 21, it can be readily seen that:

$$k_3 = \frac{R_3}{R_1} \cdot \frac{R_2}{R_0} \cdot V_{REF} \tag{43}$$

As set forth above, $V_{REF}$ is a temperature-stabilized voltage. As is well-known in the art, in integrated circuit technology, the ratio between resistances can be maintained with a very high precision over the operating temperature range of the circuits. Therefore, the constant $k_3$ in Equation 43 and in Equation 21 will be constant over the operating temperature range of the integrated circuit since it is defined as a function of resistance ratios and a temperature-stabilized voltage $V_{REF}$.

Applicant has described a novel integrated circuit means for controlling a switching voltage convertor to provide an output voltage that remains substantially constant over wide variations in the input voltage applied to the switching voltage convertor. The above-described integrated circuit can be constructed to dissipate substantially less than 100 mW. Therefore, it is particularly advantageous to use the apparatus of the present invention in a device connected to a subscriber telephone loop wherein the amount of power available for such devices is on the order of 400 mW. All the principal components of the device can be advantageously constructed in a single integrated circuit. Thus, except for the inductor, the capacitor, the switch and a voltage reference for $V_{REF}$, a single integrated circuit can provide the control circuit for generating a control signal to cause the magnitude of the output voltage $V_{OUT}$ to be independent of fluctuations in the input voltage $V_{IN}$.

What is claimed is:

1. A switching voltage convertor having a switch which is periodically opened and closed to control the application of an input voltage to an output circuit, said output circuit providing an output voltage having a magnitude proportional to the magnitude of the input voltage in a ratio dependent on the duty cycle of the closing of said switch, comprising:
    an error circuit which provides an error output signal proportional to the difference between said output voltage and a constant reference voltage;
    a divider circuit which provides a first control signal which is proportional to the ratio of said error output signal to said input voltage; and
    a pulse width convertor circuit which provides a second control signal to drive said switch with a duty cycle proportional to the magnitude of said first control signal.

2. The switching voltage convertor, as defined in claim 1, wherein said divider circuit comprises:
    a first and a second resistor having a substantially constant, temperature independent first resistance ratio;
    a third and a fourth resistor having a substantially constant, temperature independent second resistance ratio;
    a temperature-stabilized reference voltage having a constant magnitude; and
    means for interconnecting said first, second, third and fourth resistors in a manner such that said magnitude of said first control signal is substantially equal to the product of said first resistance ratio, said second resistance ratio, said reference voltage, and said ratio of said error output signal to said input voltage.

3. The switching voltage convertor, as defined in claim 2, wherein said means for interconnecting said resistors comprises transistors interconnected so that the current through the first resistor is proportional to the voltage of said first control signal, the current through the second resistor is proportional to the error output signal, the current through the third resistor is proportional to the input voltage, and the current through the fourth resistor is proportional to the temperature-independent reference voltage.

4. The switching voltage convertor, as defined in claim 3, wherein said first, second, third and fourth currents are related according to the following equation:

$$I_3 = (I_1 \cdot I_0)/I_2$$

wherein $I_3$ represents said first current, $I_1$ represents said second current, $I_2$ represents said third current and $I_0$ represents said fourth current.

5. The switching voltage convertor, as defined in claim 1, wherein said pulse width converter circuit comprises:
    a voltage generator for providing a linearly varying voltage; and
    a comparator for comparing said linearly varying voltage to said first control signal, said comparator causing said second control signal to be active when the magnitude of said second control signal is greater than the magnitude of said linearly varying voltage.

6. In a switching voltage convertor having an input voltage with a varying magnitude, a method of generating an output voltage with a constant magnitude, comprising the steps of:
    opening and closing a switch to periodically apply said input voltage to an output circuit which provides said output voltage, said output voltage having a magnitude proportional to the magnitude of said input voltage in a ratio dependent on the duty cycle of the closing of said switch;

comparing the magnitude of said output voltage to the magnitude of a reference voltage and generating an error signal having a magnitude proportional to the difference in said magnitudes of said output voltage and said reference voltage;

generating a first control signal having a magnitude proportional to the ratio of said magnitude of said error signal to said magnitude of said input voltage; and generating a second control signal to drive said switch with a duty cycle proportional to the magnitude of said first control signal.

* * * * *